United States Patent Office 3,011,991
Patented Dec. 5, 1961

3,011,991
COMPOSITION OF MATTER COMPRISING AN ACRYLONITRILE POLYMER AND A PYRIDINE BORANE AND SPINNING SOLUTION CONTAINING SAME
Kenneth H. Anderson, South Charleston, and Solomon P. Hersh, Charleston, W. Va., assignors to Union Carbide Corporation, a corporation of New York
No Drawing. Filed Feb. 12, 1960, Ser. No. 8,248
12 Claims. (Cl. 260—32.4)

This invention relates to stabilized resin compositions. More particularly, it is concerned with stabilized acrylonitrile-containing resin compositions and spinning solutions.

As is well known in the art, acrylonitrile-containing resins will darken in color when heated, whether in solution or not. This darkening is undesirable since it detracts from the visual appearance of the resins, and is particularly undesirable when the resin is converted to fibers, since the color formed makes the fibers less desirable aesthetically, and more difficult to dye properly. Attempts have been made to overcome this defect by the addition of various stabilizers to the resins, such as, for example, trialkyl phosphites, trialkyl phosphines, various organic tin salts, and a multiplicity of other compounds. None, however, have achieved the desired goal, even though some of the stabilizers heretofore used have shown some improvement.

It has now been found that pyridine borane and alkyl substituted pyridine boranes are effective stabilizers for increasing the resistance of acrylonitrile-containing polymers to decomposition by heat and light. It has also been found that in some instances, depending on the solvent employed to dissolve the resin, the pyridine boranes also have a bleaching effect on the resin solution.

The suitable pyridine boranes are pyridine borane and the alkyl substituted derivatives thereof in which the alkyl radicals contain from 1 to about 10 carbon atoms. Illustrative alkyl substituted pyridyl boranes useful in this invention are the 2-, 3- and 4-methylpyridine boranes, 2,4-dimethylpyridine borane, the 2-, 3- and 4-ethylpyridine boranes, 2-ethyl-3,5-dimethylpyridine borane, 3-ethyl-4-methylpyridine borane, 4-ethyl-2-methylpyridine borane, 5-ethyl-2-methylpyridine borane, 2-propylpyridine borane, the 2-, 3- and 4-isopropylpyridine boranes, 2,4,6-trimethylpyridine borane, 2-hexylpyridine borane, 2-ethylhexylpyridine borane, 2-decylpyridine borane, 4-decylpyridine borane, and the like.

The concentration of the pyridine borane compound added to the acrylonitrile-containing resin can be formed about 0.02% or less to about 5% or more by weight, based on the weight of the resin. The only requirement is that a stabilizing amount, sufficient to stabilize the resin against heat and light degradation, be added to the resin or solution thereof. Where a bleaching effect is desired, the same concentrations are applicable. The preferred concentration of the pyridine borane stabilizers charged to the resin or to the resin solution is from about 0.1% to about 2% by weight. The stabilizers can be added to the resin by any of the conventional procedures well known to the art; however, it is most readily added by dissolving it with the resin in a suitable solvent.

The pyridine boranes used as stabilizers in this invention can also be used in combination with the conventional, well known stabilizers heretofore used, as will be shown in the examples, without deleterious effects. Among some of the stabilizers that can be used with pyridine borane one can mention dioctyltin maleate, tributyl phosphine, triisooctyl phosphite, tripropenyl phosphite, tributyl phosphonite, tetrabutyltin, trimethyltin chloride, tributyltin acetate, 5-ethyl-2(2-ethylhexyloxy)-2-oxo-4-propyl-1,3,2-dioxaphosphorinane, the diglycidyl ether of Bisphenol-A, and the like. These conventional stabilizers can be present at the concentrations usually employed, which are well known to the art.

The pyridine boranes are effective in reducing the amount of discoloration that normally occurs when acrylonitrile-containing resins are heated during the preparation of spinning dope solutions for the production of fibers. They are especially effective in bleaching the resin solution, that is, making it whiter in color, when solvents which do not react with the pyridine boranes are used. The improvements in stabilization and bleaching, when the bleaching effect is obtained, are carried into the spun fiber or shaped article upon exposure to heat and light.

The stabilization effect of the pyridine boranes is observed regardless of which of the conventional solution-forming organic solvents is used. Illustrative of the organic solvents which can be used are acetonitrile, dimethylformamide, dimethylacetamide, ethyl carbamate, ethylene carbonate, acetone, cyclohexanone, gamma-butyrolactone, N-methyl-2-pyrrolidone, and the like. However, the bleaching effect is observed only with those solvents which do not react with the pyridine borane. Thus, for example, no bleaching is observed with ketones, such as acetone and cyclohexanone, or other carbonyl-containing solvents, or unsaturated solvents. This is not too surprising since it is known that pyridine borane reacts with such compounds; for example, acetone is reduced to isopropanol. Nevertheless, while the bleaching effect may not be achieved with such solvents, pyridine borane is still an effective stabilizer for the resin itself.

The acrylonitrile-containing resins which can be stabilized and/or bleached with pyridine borane are the homopolymeric polyacrylonitriles and those polymers containing at least about 25% by weight of acrylonitrile. The fibers produced from acrylonitrile-containing resins which contain at least 35% acrylonitrile have been given the generic names of acrylic and modacrylic fibers by the Federal Trade Commission, under the provisions of the Textile Fiber Products Identification Act enacted by Congress on September 2, 1958. The materials copolymerized with the acrylonitrile are those ethylenically unsaturated monomers copolymerizable therewith containing at least one olefinic ($>C=C<$) double bond in the molecule, such as in vinyl chloride, vinylidene chloride, vinyl acetate, methyl methacrylate, styrene, allyl acetate, butadiene, and the like. The term "acrylonitrile-containing resins" is used in this specification to include homopolymers, copolymers, terpolymers, etc. Acrylonitrile - containing resins are well known to the art, and can be prepared, for example, as described in U.S. 2,420,330, U.S. 2,603,620 and U.S. 2,868,756.

The following tests were employed in evaluating the resin solutions and fibers for stability and bleaching effect.

(a) *Resin solution color value (RSCV).*—A 25% total solids solution in acetone is prepared by solvating the resin and additives at a suitable temperature, as indicated in the examples. The resin solution is then heated at 80° C. to 90° C. for either two or three hours in a thermostated water bath. The resin color value is then determined quantitatively by measuring the light transmission at wave lengths of 430 millimicrons and 600 millimicrons through dimethylformamide solutions containing 4% resin. This solution is prepared by weighing out approximately 5 g. of the above dope into a vial and then adding a volume of dimethylformamide in milliliters equal to 5.3 times the weight of the dope in grams. The dimethylformamide contains 5 ml. of glacial acetic acid per liter. The color value of the solution so prepared is determined using a Beckman spectrophotometer, model B, and is calculated by dividing the percent transmission at 430 millimicrons by the percent transmission at 600 millimicrons. Control runs are carried out in the same manner, but without the addition of any stabilizer. The color value of the initial unheated resin is determined in a solvent having the same composition, with the exception that the resin is put into solution at room temperature.

(b) *Spun fiber color (SFC).*—The color of staple fibers is determined by placing a hand-carded sample of fiber in a box having a glass face, and the spectral reflectance curve is then measured on a G.E. recording spectrophotometer. The whiteness of the fiber is reported as the percent reflectance at 550 millimicrons and yellowness is reported as the difference in reflectance at 550 millimicrons and 430 millimicrons. The best fibers have high whiteness values and low yellowness values. In some instances, masking pigments were included in the fibers to reduce the yellowness. These pigments, in effect, act as "bluing" agents, but only at the expense of a sacrifice in whiteness. In general, each 1 percent decrease in yellowness obtained by the addition of masking pigment is accompanied by 2 percent decrease in whiteness, the net result being to produce an aesthetically neutral gray fiber from an undesirable yellow one.

(c) *Fabric color (FC).*—The spun yarn was knitted into tubing, scoured and lightly pressed. The percent reflectance of the knit sample was then measured using a Colormaster color difference meter, model 4, manufactured by the Manufacturers Engineering & Equipment Corp., Hatboro, Pa. The Colormaster color difference meter was equipped with a blue tristimulus Z filter. High reflectance values are preferred.

(d) *Gardner color valve (GCV).*—These values were determined from a 20% solution of the resin in the solvent. The resin and stabilizer were dissolved in the solvent by shaking at 50° C. for 30 minutes; then the solution was heated at 80° C. for one hour, and the Gardner color value determined. Low Gardner color values are preferred. The Gardner color value is determined by comparing the color intensity of the test liquid with permanent glass color standards corresponding to the 1933 color series of the Institute of Paint & Varnish Research using the Hellige color comparator and color disc (varnish No. 620C-40). The glass sample tube is filled with the solution whose color intensity is to be determined, and it is then inserted in the Hellige comparator for comparison with the standard colors on the disc. The disc is rotated until a color match is made between the test solution and the glass color standard, and the color intensity is read off the comparator.

The following examples further serve to define the invention, but are not to be construed as limiting it thereto.

EXAMPLE 1

Four one pint pressure bottles, each containing 150 g. of acetonitrile, were chilled in an acetone-Dry Ice bath. Then 2% by weight, based on the weight of resin, of the desired stabilizers was dissolved in three of the bottles. Fifty grams of a 40/60 acrylonitrile/vinyl chloride copolymer having a specific viscosity of 0.257, as measured at 29° C. from a 0.2% solution of the resin in dimethylformamide, was added. The resin in the four bottles was solvated by heating at 50° C. for 30 minutes in a tumbling water bath. The four bottles were then heated in a water bath at 80° C. for two hour. The resin solution color values (RSCV) are tabulated below and compared with a stabilizer-free solution of 4 g. of the same resin dissolved without heating in a solvent mixture of 84.6 ml. of dimethylformamide and 15.4 ml. of acetonitrile.

Stabilizer: RSCV
- Pyridine borane, 2% _____ 94
- Triisooctyl phosphite, 2% _____ 80
- Dioctyltin maleate, 2% _____ 78
- None, heated _____ 63
- None, unheated _____ 90

It is readily apparent that pyridine borane shows a greater stabilization effect than that achieved by the conventional stabilizers. It is also evident that a pronounced bleaching effect occurred.

EXAMPLE 2

A series of resin solutions in acetonitrile was prepared in a manner similar to that described in Example 1 using the same 40/60 copolymer of acrylonitrile and vinyl chloride therein described. There was present in the resin 0.0021 weight percent Thiofast Violet and 0.0015 weight percent Indo Blue, two well known conventional masking pigments. The resin solutions were spun into fibers by similar extrusion and coagulation procedures using conventional spinning techniques. The spun fiber color (SFC) was determined on each sample, and the results are tabulated below:

| Stabilizer | SFC | |
|---|---|---|
| | Whiteness | Yellowness |
| Pyridine borane, 0.1% | 71.6 | 4.4 |
| Pyridine borane, 0.1% plus 2% A plus 2% B | 75.7 | 6.4 |
| Triisooctyl phosphite, 1% plus 2% A plus 2% B | 69.5 | 9.5 |
| 2% A plus 2% B | 70.5 | 12.3 |
| 2% A | 72.0 | 12.0 |

NOTE.—A=dioctyltin maleate. B=5-ethyl-2(2-ethylhexyloxy)-2-oxo-4-propyl-1,3,2-dioxaphosphorinane.

It can be seen that pyridine borane, whether alone or in combination with conventional stabilizers, was a better stabilizer since the fibers containing pyridine borane had equal or higher whiteness values than those containing the conventional stabilizers, and much lower yellowness values.

Fibers were also spun from the same resin used above, but without any added masking pigment present. The fibers stabilized with 0.1% pyridine borane had whiteness/yellowness values of 80.0/11.5; whereas the fibers without any stabilizer present had whiteness/yellowness values of 77.0/13.0.

EXAMPLE 3

A series of solutions containing varying concentrations of pyridine borane was prepared and tested as described in Example 1. Solution I was an acetonitrile solution of a 40/60 copolymer of acrylonitrile and vinyl chloride having a specific viscosity of 0.264 as measured at 20° C. from a 0.2 g./100 ml. solution of the resin in cyclohexanone. Solution II was an acetonitrile solution of the copolymer which was used in Example 1. Solution III was an acetone solution of the same copolymer used to prepare solution II. Control and comparative solutions were also prepared and tested. The results are tabulated below:

| Stabilizer | RSCV | | |
|---|---|---|---|
| | Sol. I | Sol. II | Sol. III |
| Pyridine borane, 2% | 95.0 | 94.4 | 79.9 |
| Pyridine borane, 1% | 94.5 | 94.0 | 71.4 |
| Pyridine borane, 0.5% | 92.5 | 93.4 | 86.2 |
| Pyridine borane, 0.25% | 93.5 | | 70.6 |
| Pyridine borane, 0.1% | 92.4 | 92.9 | 70.2 |
| Pyridine borane, 0.05% | 93.9 | 92.4 | 71.4 |
| Dioctyltin maleate, 2% | 77.0 | 78.0 | 70.0 |
| None, heated | 58.0 | 63.0 | 63.0 |
| None, unheated | 92.0 | 90.0 | 90.0 |

The improvement in stabilization and the bleaching effect are clearly evident in the acetonitrile solutions. The acetone solution, however, shows a stabilizing effect only; in view of the fact that it is known that pyridine borane reacts with ketones, this was to be expected, as previously stated.

EXAMPLE 4

A series of resin solutions in acetonitrile was prepared in a manner similar to that described in Example 1. The resin was the 40/60 copolymer of acrylonitrile and vinyl chloride described in Example 1. There was present in the resin 0.0021 weight percent Thiofast Violet and 0.015% Indo Blue as masking pigments. The resin solutions were spun into fibers by similar extrusion and coagulation procedures using conventional spinning techniques. The spun fiber color (SFC) was determined on each sample and, the results are tabulated below:

| Stabilizer | SFC | |
|---|---|---|
| | Whiteness | Yellowness |
| Pyridine borane, 0.1%, plus dioctyltin maleate, 2% | 75.4 | 5.9 |
| Pyridine borane, 0.05% plus dioctyltin maleate, 2% | 73.0 | 5.0 |
| Dioctyltin maleate, 2% | 72.0 | 12.0 |

The improvement due to the pyridine borane, evidenced by higher whiteness values and much lower yellowness values, is clearly evident.

EXAMPLE 5

A series of resin solutions was prepared in the manner described in Example 1 using terpolymers of about 68% acrylonitrile, about 23% vinyl chloride and about 9% vinylidene chloride. Resin I had a specific viscosity of 0.373 as measured at 29° C. from a 0.2% solution in dimethylformamide, and resin II had a specific viscosity of 0.376 when measured under the same conditions. The resin solutions wer spun into fibers by similar extrusion and coagulation procedures using conventional spinning techniques. The spun yarn was then knit into fabrics, and the fabric reflectance or fabric color (FC) was determined on each fabric. The results are tabulated below.

Stabilizer: FC, Percent
Resin I plus 0.1% pyridine borane _____ 77
Resin I plus 0.1% pyridine borane plus 1% A plus 2% C _____ 71
Resin I plus 1% A plus 2% C _____ 63
Resin I, control _____ 64
Resin II plus 0.1% pyridine borane _____ 66
Resin II, control _____ 57

A = Dioctyltin maleate.
C = Diglycidyl ether of Bisphenol-A.

EXAMPLE 6

A series of solutions was prepared, in a manner similar to that described in Example 1, to illustrate the bleaching effect obtained with pyridine borane when the solvent employed is one which does not react with pyridine borane. The resin solution color values (RSCV) were obtained after the solutions were heated under the conditions indicated in the table. It can be seen from the data that the bleaching effect is not achieved when the solvent is a ketone. All of the solutions tested contained 25% resin and 1.0% pyridine borane, based on the resin. The results are tabulated below:

BLEACHING OF POLYMER SOLUTIONS BY PYRIDINE BORANE
[All solutions contain 25% resin and 0.25% pyridine borane]

| Polymer | Solvent | Color value | | Heating conditions | |
|---|---|---|---|---|---|
| | | Initial resin | Heated solution | Time, hours | Temp., °C. |
| 40/60 copolymer of acrylonitrile and vinyl chloride | Acetone | 90 | 71.4 | 0.5–2.0 | 50–80 |
| | Cyclohexanone | 90 | 78.9 | 1.0 | 80 |
| | Acetonitrile | 90 | 94.0 | 0.5–2.0 | 50–80 |
| | Dimethyl formamide | 90 | 91.9 | 1.0 | 80 |
| | Ethylene carbonate | 90 | 93.5 | 2.5 | 80 |
| 70/30 copolymer of acrylonitrile and vinyl chloride | Acetonitrile | 92 | 93.0 | 2.5 | 80 |
| | Dimethyl formamide | 92 | 93.0 | 1.5 | 80 |
| | Ethylene carbonate | 92 | 92.8 | 2.5 | 80 |
| 55/45 copolymer of acrylonitrile and vinylidene chloride | Acetonitrile | 86 | 94.4 | 0.5–2.0 | 50 |
| | Ethylene carbonate | 86 | 92.3 | 2.5 | 80 |
| 70/20/10 terpolymer of acrylonitrile, vinyl chloride and vinylidene chloride | Acetonitrile | 93 | 94.0 | 3.5 | 90 |
| | Dimethyl formamide | 92.5 | 93.5 | 1 | 90 |
| | Ethylene carbonate | 92.5 | 92.9 | 1.5 | 90 |
| Polyacrylonitrile | Dimethyl formamide | 88 | 97.9 | 1 | 90 |
| | Ethylene carbonate | 88 | 95.5 | 1.5 | 90 |

EXAMPLE 7

A series of solutions stabilized with pyridine borane was prepared. The stabilizing effect of pyridine borane at different concentrations on various resins and in different solvents was determined. The resin solutions were prepared by cooling 24 g. of the solvent in an acetone-Dry Ice bath. The stabilizer was then dissolved in the solvent and 6 g. of the acrylonitrile-containing resin was added to the chilled solution. After capping the bottles, they were rotated end over end in a thermostated water bath at 50° C. for 30 minutes to solvate the resin. This was followed by a one hour solvating period at 80° C. Thereafter, the Gardner color value (GCV) was determined; the results are tabulated below. As previously indicated, low Gardner color values are preferred; it is readily apparent from the tabulated results that pyridine borane is an effective stabilizer.

| Polymer | Solvent | Pyridine borane, percent | GCV |
|---|---|---|---|
| 40/60 copolymer of acrylonitrile and vinyl chloride. | Acetone | 0.00 | 8 |
| | | 0.5 | 4 |
| | | 1.0 | 4 |
| | | 2.0 | 4 |
| | Acetonitrile | 0.00 | 9 |
| | | 0.05 | 3 |
| | | 0.5 | 3 |
| | | 1.0 | 3 |
| | | 2.0 | 3 |
| | Dimethylformamide | 0.00 | 8 |
| | | 0.5 | 4 |
| | | 1.0 | 4 |
| | | 2.0 | 4 |
| 70/20/10 terpolymer of acrylonitrile, vinyl chloride and vinylidene chloride. | do | 0.0 | 6 |
| | | 0.05 | 4 |
| | | 0.5 | 2 |
| | | 1.0 | 2 |
| | | 2.0 | 2 |
| 70/30 copolymer of acrylonitrile and vinyl chloride. | do | 0.00 | 4 |
| | | 0.05 | 2 |
| | | 0.5 | 2 |
| | | 1.0 | 2 |
| | | 2.0 | 2 |
| 55/45 copolymer of acrylonitrile and vinylidene chloride. | do | 0.00 | 7 |
| | | 0.05 | 5 |
| | | 0.5 | 2 |
| | | 1.0 | 2 |
| | | 2.0 | 2 |
| Polyacrylonitrile | do | 0.00 | 6 |
| | | 0.5 | 2 |
| | | 1.0 | 2 |
| | | 2.0 | 2 |

EXAMPLE 8

The effectiveness of pyridine borane as a light and heat stabilizer for the acrylonitrile-containing fibers was established by spinning solutions of the resins containing 0.1% pyridine borane on the weight of the fiber by conventional spinning techniques. The fibers were then compared for heat and light stability with unstabilized resins.

Light stability was determined by exposing the fibers in an Atlas fadeometer at 145° F. for periods of 20, 40, 60 and 80 hours, and then measuring light reflectance using the Colormaster color difference meter. To give a quantitative value to the light stability, the reflectance is converted to K/S value by the following equation, in which R is the light reflectance:

$$K/S = \frac{(1-R)^2}{2R}$$

By plotting K/S values versus the hours of exposure $\times 10^4$, a straight line is obtained, the slope of which is reported as K/S'. This value is directly proportional to the rate of yellowing during exposure to light. Low K/S' values indicate better light stability.

Heat stability was determined by scorching the fiber sample at 170° C. for six minutes and then measuring light reflectance with the Colormaster color difference meter. The increase in yellowness at 170° C., $R_{170}$, scorching is calculated by the following equation:

$$R_{170} = \left[ \frac{(1-R_f)^2}{2R_f} - \frac{(1-R_o)^2}{2R_o} \right] \times 10$$

in which $R_o$ is the reflectance before and $R_f$ is the reflectance after scorching. Low values indicate better heat stability.

The results obtained are summarized below. Fiber I represents fibers produced from terpolymers similar in composition to the terpolymer used in Example 5; fiber II represents fibers produced from copolymers having an acrylonitrile/vinyl chloride content of about 70/30.

| Fiber | K/S' | | $R_{170}$ | |
|---|---|---|---|---|
| | Unstabilized | Stabilized | Unstabilized | Stabilized |
| I | 107 | 65 | | |
| I | 89 | 56 | 9.5 | 8.3 |
| I | 105 | 49 | 8.0 | 7.6 |
| II | 53 | 12 | 16.9 | 9.9 |

EXAMPLE 9

A series of solutions containing varying concentrations of 2,4-dimethylpyridine borane stabilizer was prepared and tested as described in Example 1. Solution I was an acetonitrile solution of a terpolymer similar in composition to that used in Example 5. Solution II was an acetonitrile solution of a copolymer similar in composition to that used in Example 1. The results are tabulated below:

| Stabilizer conc., percent | RSCV | |
|---|---|---|
| | Sol. I | Sol. II |
| 1.0 | 98.5 | 93.7 |
| 0.1 | 98.5 | 86.9 |
| 0.05 | 96.5 | 92.5 |
| 0.025 | 93.5 | 81.0 |
| 0.0 | 82.0 | 63.0 |

What is claimed is:

1. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and a stabilizing amount, sufficient to stabilize said resin against heat and light degradation, of a pyridine borane selected from the group consisting of pyridine borane and alkyl substituted pyridine boranes in which the alkyl radicals contain from 1 to about 10 carbon atoms.

2. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.02% to about 5% by weight, based on the weight of said resin, of a pyridine borane selected from the group consisting of pyridine borane and alkyl substituted pyridine boranes in which the alkyl radicals contain from 1 to about 10 carbon atoms.

3. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of pyridine borane.

4. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of 2,4-dimethylpyridine borane.

5. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and a stabilizing amount, sufficient to stabilize said resin against heat and light degradation and to bleach said spinning solution of a pyridine borane selected from the group consisting of pyridine borane and alkyl substituted pyridine boranes in which the alkyl radicals contain from 1 to about 10 carbon atoms.

6. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.02% to about 5% by weight, based on the weight of said resin, of a pyridine borane selected from the group consisting of pyridine borane and alkyl substituted pyridine boranes in which the alkyl radicals contain from 1 to about 10 carbon atoms.

7. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of pyridine borane.

8. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of 2,4-dimethylpyridine borane.

9. A spinning solution, comprising acetonitrile, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of a pyridine borane selected from the group consisting of pyridine borane and alkyl substituted pyridine boranes in which the alkyl radicals contain from 1 to about 10 carbon atoms.

10. A spinning solution, comprising acetonitrile, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of pyridine borane.

11. A spinning solution, comprising acetone, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of a pyridine borane selected from the group consisting of pyridine borane and alkyl substituted pyridine boranes in which the alkyl radicals contain from 1 to about 10 carbon atoms.

12. A spinning solution, comprising acetone, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 3% by weight, based on the weight of said resin, of pyridine borane.

No references cited.